United States Patent
Kim et al.

(10) Patent No.: US 8,804,301 B2
(45) Date of Patent: Aug. 12, 2014

(54) CONDUCTIVE PASTE FOR INTERNAL ELECTRODE OF MULTILAYER CERAMIC ELECTRONIC COMPONENT AND MULTILAYER CERAMIC ELECTRONIC COMPONENT INCLUDING THE SAME

(75) Inventors: Jong Han Kim, Gyunggi-do (KR); Jun Hee Kim, Gyunggi-do (KR)

(73) Assignee: Samsung Electro-Mechanics, Co., Ltd., Suwon, Gyunggi-Do (KR)

( * ) Notice: Subject to any disclaimer, the term of this patent is extended or adjusted under 35 U.S.C. 154(b) by 84 days.

(21) Appl. No.: 13/536,409

(22) Filed: Jun. 28, 2012

(65) Prior Publication Data
US 2013/0003257 A1 Jan. 3, 2013

(30) Foreign Application Priority Data
Jun. 30, 2011 (KR) .................. 10-2011-0065115

(51) Int. Cl.
*H01G 4/005* (2006.01)
*H01G 4/30* (2006.01)

(52) U.S. Cl.
USPC .................. 361/303; 361/301.4; 361/305

(58) Field of Classification Search
USPC .............. 361/301.4, 303, 305, 311, 321.4
See application file for complete search history.

(56) References Cited

U.S. PATENT DOCUMENTS

2002/0075632 A1* 6/2002 Nakano et al. ............... 361/320
2004/0070903 A1* 4/2004 Nagai et al. .................. 361/58

FOREIGN PATENT DOCUMENTS

| JP | 2009-147359 | * | 7/2009 | ............... H01B 1/22 |
| KR | 10-2006-0006021 A | | 1/2006 | |
| KR | 10-2008-0005444 A | | 1/2008 | |
| KR | 10-2011-0068231 A | | 6/2011 | |

* cited by examiner

*Primary Examiner* — Jayprakash N Gandhi
*Assistant Examiner* — Dion R Ferguson
(74) *Attorney, Agent, or Firm* — McDermott Will & Emery LLP

(57) ABSTRACT

A conductive paste for an internal electrode of a multilayer ceramic electronic component capable of restraining a generation of cracks by reducing internal stress, and a multilayer ceramic electronic component fabricated by using the same are provided. The conductive paste for an internal electrode of a multilayer ceramic electronic component includes: 100 parts by weight of a conductive metal powder; and 0.6 to 2.4 parts by weight of an organic binder. The use of the conductive paste can reduce internal stress of a multilayer ceramic electronic component, thus restraining a generation of cracks therein in the multilayer ceramic electronic component.

10 Claims, 2 Drawing Sheets

CONDUCTIVE PASTE FOR INTERNAL ELECTRODE OF MULTILAYER CERAMIC ELECTRONIC COMPONENT AND MULTILAYER CERAMIC ELECTRONIC COMPONENT INCLUDING THE SAME

CROSS-REFERENCE TO RELATED APPLICATIONS

This application claims the priority of Korean Patent Application No. 10-2011-0065115 filed on Jun. 30, 2011, in the Korean Intellectual Property Office, the disclosure of which is incorporated herein by reference.

BACKGROUND OF THE INVENTION

1. Field of the Invention

The present invention relates to a conductive paste and, more particularly, to a conductive paste for an internal electrode of a multilayer ceramic electronic component capable of restraining a generation of cracks by reducing internal stress, and a multilayer ceramic electronic component fabricated by using the same.

2. Description of the Related Art

Recently, as electronic products have been reduced in size and increased in capacity and have had multifunctionality implemented therein, demand for multilayer ceramic electronic component has been on the rise.

In particular, in the case of a multilayer ceramic capacitor, when dielectric layers are formed to be thicker than internal electrodes, connectivity of the internal electrodes does not greatly affect a generation of cracks.

However, as high capacity multilayer ceramic capacitors have been developed and layers thereof are becoming increasingly thinner, dielectric layers of a super-capacity multilayer ceramic capacitor have a thickness one to two times that of internal electrodes.

When internal electrodes are formed by printing a paste onto ceramic green sheets, unevenness of electrode patterns due to a difference in leveling of the printed paste appears as a dispersion of electrode connectivity after a firing operation, and here, as the leveling characteristics are better, electrode connectivity (coverage) is increased.

However, in the case that a plurality of sheets with the internal electrode pattern printed thereon are accumulated are fired or mounted, internal stress is generated due to thermal shock to cause a generation of cracks.

SUMMARY OF THE INVENTION

An aspect of the present invention provides a conductive paste for an internal electrode of a multilayer ceramic electronic component capable of restraining a generation of cracks by reducing internal stress, and a multilayer ceramic electronic component including the same.

According to an aspect of the present invention, there is provided a conductive paste for an internal electrode of a multilayer ceramic electronic component including: 100 parts by weight of a conductive metal powder; and 0.6 to 2.4 parts by weight of an organic binder.

The organic binder may be polyvinyl butyral (PVB).

A molecular weight after PVB dispersion may be 170000 or less.

The conductive paste may further include: a cellulose-based resin having a content equal to or less than 3.0 parts by weight.

The cellulose-based resin may be ethyl cellulose.

The conductive metal powder may be one or more selected from the group consisting of silver (Ag), lead (Pb), platinum (Pt), nickel (Ni), and copper (Cu).

The conductive metal powder may have an average particle size ranging from 50 nm to 400 nm.

According to another aspect of the present invention, there is provided a multilayer ceramic electronic component including a ceramic main body; and an internal electrode formed within the ceramic main body by using a conductive paste for an internal electrode including 100 parts by weight of a conductive metal powder and 0.6 to 2.4 parts by weight of an organic binder.

The organic binder may be polyvinyl butyral (PVB).

A molecular weight after PVB dispersion may be 170000 or less.

The conductive paste for an internal electrode may further include a cellulose-based resin having a content equal to or less than 3.0 parts by weight.

The cellulose-based resin may be ethyl cellulose.

The conductive metal powder may be one or more selected from the group consisting of silver (Ag), lead (Pb), platinum (Pt), nickel (Ni), and copper (Cu).

The conductive metal powder may have an average particle size ranging from 50 nm to 400 nm.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
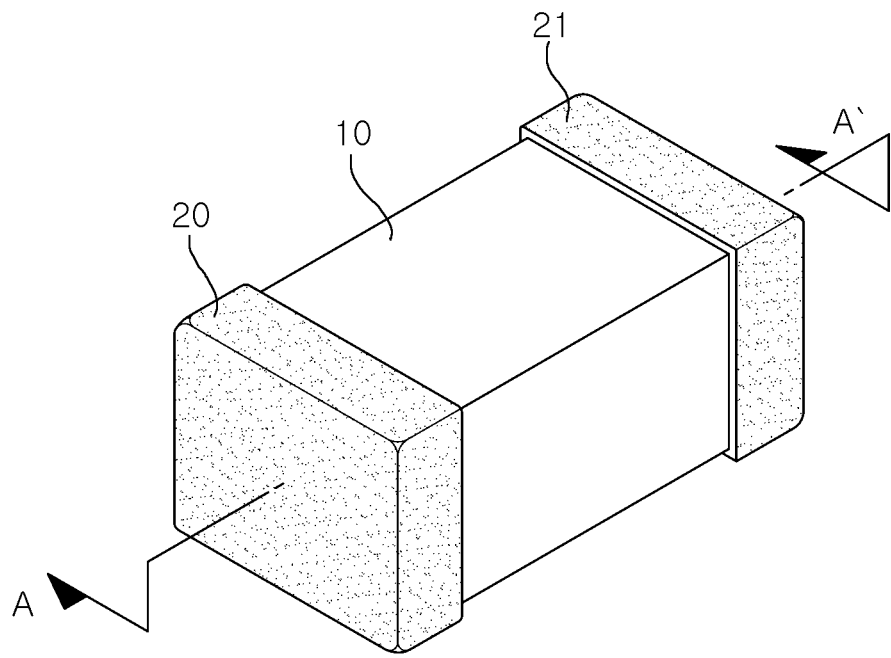
FIG. 1 is a perspective view schematically showing a multilayer ceramic capacitor according to an embodiment of the present invention.

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

A conductive paste for an internal electrode of a multilayer ceramic electronic component according to an embodiment of the present invention may include a 100 parts by weight of a conductive metal power, 0.6 to 2.4 parts by weight of an organic binder.

The conductive metal powder may be one or more selected from the group consisting of silver (Ag), lead (Pb), platinum (Pt), nickel (Ni), and copper (Cu), and an average particle size of the conductive metal powder may range from 50 nm to 400 nm.

The conductive metal is not particularly limited as long as it has excellent electrical conductivity. For example, silver (Ag), lead (Pb), platinum (Pt), nickel (Ni), and copper (Cu), or the like, may be used, and a mixture of two or more thereof may also be used.

When the particle size is less than 50 nm, it may be difficult to control shrinkage in a sintering process, and when the particle size exceeds 400 nm, it may be difficult to form an inner electrode in the form of a thin pattern.

An organic binder may be medium binding conductive metal particles. Since the conductive metal particles are bound by the organic binder, the conductive paste may have viscosity.

The organic binder may be any polymer material as long as it can bind conductive metal particles. The organic binder may be polyvinyl butyral (PVB) but the present invention is not limited thereto.

Polyvinyl butyral, having a structure including chains and cross-linkages, has properties in which chains are broken due to deformation caused by dispersion stress so as to have difficulty in recovering elasticity to secure a flat printing surface, but advantageously having strong adhesive strength.

When polyvinyl butyral is less than 0.6 parts by weight, leveling of the internal electrodes formed by printing the conductive paste and electrode connectivity (coverage) of fired internal electrodes is excellent; however, cracks may be generated due to internal stress resulting from thermal shock during a firing or mounting process.

When polyvinyl butyral exceeds 2.4 parts by weight, electrode connectivity (coverage) is excessively reduced to degrade electrical characteristics such as capacity, or the like.

When polyvinyl butyral ranges from 0.6 to 2.4 parts by weight, electrical characteristics and withstand voltage characteristics of the multilayer ceramic capacitor can be implemented and a generation of cracks can be prevented without degrading paste dispersibility.

An internal electrode printed by using a paste obtained by adding 100 parts by weight of conductive metal powder and 0.6 to 2.4 parts by weight of polyvinyl butyral has locally lowered leveling characteristics.

Due to the lowered local leveling characteristics, deviation is generated in electrode connectivity after a firing operation, and thus, internal stress is lessened by the deviation.

Thus, a generation of cracks due to thermal shock caused in the firing or mounting process can be restrained.

A molecular weight after the dispersion of polyvinyl butyral may be 170000 or less.

If the molecular weight after the dispersion of polyvinyl butyral exceeds 170000, printing characteristics and electrical characteristics may be degraded.

The reason why the molecular weight exceeds 170000 after the dispersion of polyvinyl butyral is inferred to be because strong adhesive strength, an intrinsic property of polyvinyl butyral, is maintained as is.

The reason why the molecular weight is 170000 or less after the dispersion of polyvinyl butyral is inferred to be because more molecules of polyvinyl butyral are broken to slightly reduce the strong adhesive strength, an intrinsic property of polyvinyl butyral.

What affects the characteristics of the conductive paste is not the molecular weight of polyvinyl butyral before being dispersed but the molecular weight of polyvinyl butyral after being dispersed.

The dispersing process may be performed by using a roll milling method or a ball milling method. The molecular weight of polyvinyl butyral after performing ball milling may be controlled by factors such as the size or number of balls introduced during the ball milling process, a time duration, and the like. As a time duration for ball milling is lengthened, the molecular weight after the dispersion of the polyvinyl butyral may be reduced.

A cellulose-based resin may be added to the conductive paste for an internal electrode of the multilayer ceramic electronic component.

Conductive metal powder particles may be dispersed to exist in the cellulose-based resin.

The cellulose-based resin serves as a dispersion aid providing fluidity and phase stability of the paste during the dispersing process.

Also, during a process of printing the paste on the ceramic green sheet to fabricate a multilayer ceramic capacitor, the cellulose-based resin serves to planarize the paste printed surface by viscoelasticity behavior thereof.

Also, during a process of laminating a plurality of green sheets with the paste printed thereon, the cellulose-based resin serves as an adhesive providing adhesive strength between dielectric layers and inner electrode layers.

The cellulose-based resin may be ethyl cellulose (EC), but the present invention is not limited thereto.

Ethyl cellulose has a chair type structure, having rapid recovery properties due to elasticity when it is deformed due to dispersion stress. Thus, when a thin pattern is formed by printing paste, a flat printing surface can be obtained. Namely, excellent leveling characteristics can be obtained.

Ethyl cellulose, a print resin used for fabricating an internal electrode paste composition, is advantageous in that it allows paste to be printed flat due to viscoelasticity properties thereof.

Meanwhile, polyvinyl butyral is incompetent to secure a flat printing surface but advantageously has strong adhesive strength instead.

Thus, the use of only ethyl cellulose can secure a flat printing surface but has weak adhesive strength, while the use of only polyvinyl butyral can obtain strong adhesive strength but has difficulty in securing a flat printing surface.

Ethyl cellulose and polyvinyl butyral will not readily mix, due to a structural difference therebetween.

After performing printing, leveling characteristics of the printed internal electrodes may be locally lowered by adding polyvinyl butyral having poor compatibility to ethyl cellulose having excellent leveling characteristics.

A multilayer ceramic electronic component according to an embodiment of the present invention may include: a ceramic main body; and internal electrodes formed within the ceramic main body by using a conductive paste for an internal electrode including 100 parts by weight of a conductive metal power and 0.6 to 2.4 parts by weight of an organic binder.

The multilayer ceramic electronic component refers to an electronic component fabricated by laminating ceramic layers and demand for multilayer ceramic electronic components is increasing according to the trend in which electronic products have been increasingly reduced in size and have had higher capacity implemented therein, and the like. The multilayer ceramic electronic components include a multilayer ceramic capacitor, a chip inductor, a chip beads, and the like. In the present embodiment, a multilayer ceramic capacitor will be described as an example, but the present invention is not limited thereto.

Figure 2:
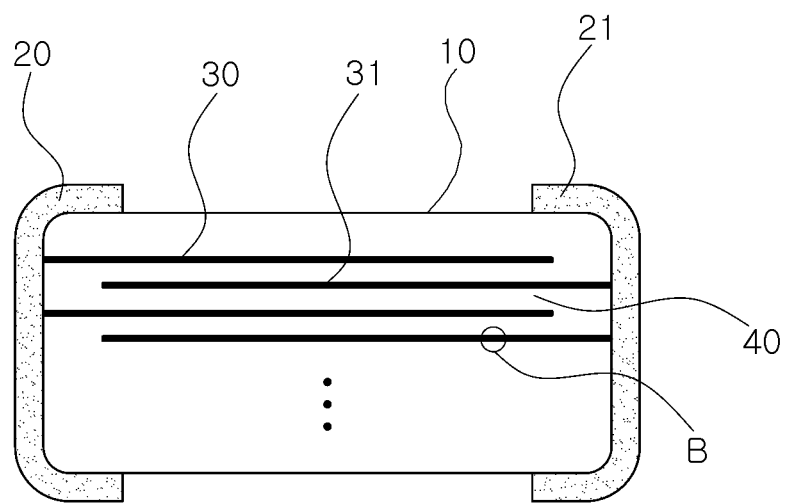
FIG. 2 is a cross-sectional view taken along line A-A' in FIG. 1.
Figure 3A:
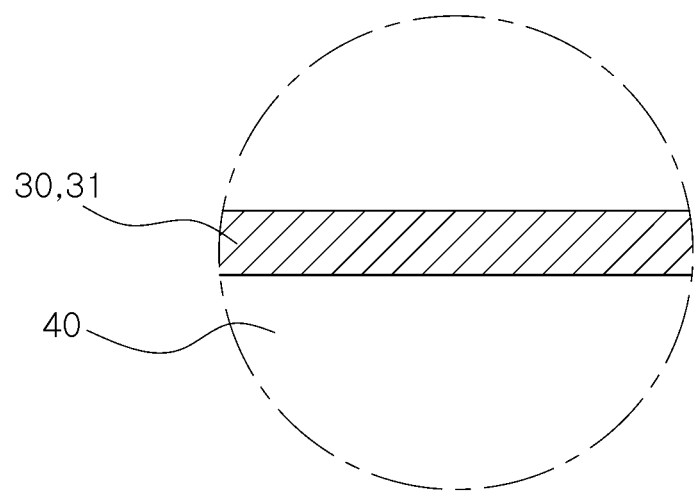
FIGS. 3A and 3B are enlarged views of portion 'B' in FIG. 2, respectively.
Figure 3B:
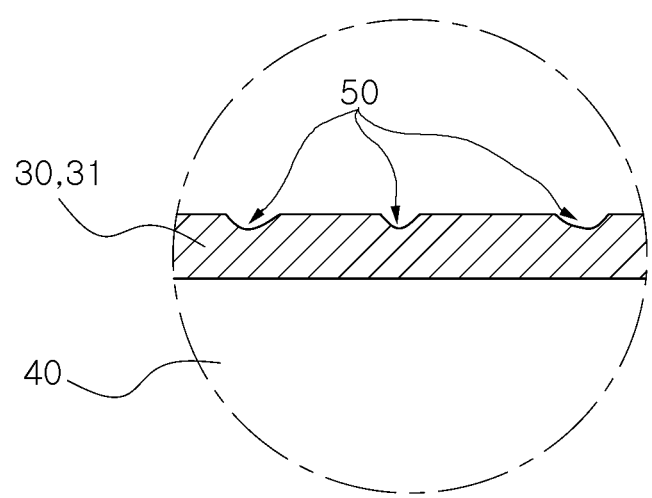

FIG. 1 is a perspective view schematically showing a multilayer ceramic capacitor according to an embodiment of the present invention. FIG. 2 is a cross-sectional view taken along line A-A' in FIG. 1. FIGS. 3A and 3B are enlarged views of a portion 'B' in FIG. 2, respectively. Specifically, FIG. 3A shows a comparative example, and FIG. 3B shows an embodiment of the present invention.

With reference to FIGS. 1 and 2, the multilayer ceramic capacitor includes a ceramic main body 10, external electrodes 20 and 21, and internal electrodes 30 and 31.

The ceramic main body 10 may be formed by laminating dielectric sheets, and here, barium titanate may be used as a dielectric material, but the present invention is not limited thereto.

The external electrodes 20 and 21 serve to transfer a voltage applied from the outside to the internal electrodes. The external electrodes 20 and 21 may be made of a conductive metal as a main ingredient and may include a glass component, or the like. The conductive metal may be copper (Cu), but the present invention is not limited thereto.

The internal electrodes 30 and 31 may be fabricated by using a conductive paste for an internal electrode including 100 parts by weight of a conductive metal powder, 0.6 to 2.4 parts by weight of an organic binder.

Details of the conductive paste for an internal electrode are the same as described above.

FIG. 3A is an enlarged view of a portion 'B' in FIG. 2 of a multilayer ceramic capacitor fabricated by using a conductive paste for an internal electrode in which polyvinyl butyral is contained in an amount less than 0.5 parts by weight. FIG. 3B is an enlarged view of the portion 'B' in FIG. 2 according to an embodiment of the present invention.

With reference to FIG. 3B, recessed portions on an upper portion of the internal electrodes 30 and 31 are portions 50 in which leveling is locally lowered. It is illustrated that the portions 50 in which leveling is locally lowered are formed on the upper portion of the internal electrodes 30 and 31, but the portions 50 in which leveling is locally lowered may also be formed on a lower portion of the internal electrodes 30 and 31.

In FIG. 3A, portions 50 in which leveling is locally lowered are not present.

Due to the presence of the portions 50 in which leveling is locally lowered, internal stress generated due to a difference in thermal expansion between a dielectric substance 40 and the internal electrodes 30 and 31 can be lessened, thus restraining a generation of cracks due to thermal shock caused during a firing or mounting process.

[Embodiment]

Dielectric slurry was fabricated by mixing a binder, a solvent, and the like, to barium titanate powder as a primary material, and processed through a method using a doctor blade to fabricate a dielectric green sheet having a thickness of 10 um on a carrier pattern.

A resin such as polyvinyl butyral, or the like, was weighed to an appropriate content and mixed with nickel powder having an average particle size of 100 nm, and subjected to 3 roll ball milling to obtain a desired level of molecular weight of polyvinyl butyral to thus fabricate a conductive paste.

The conductive paste was printed on the dielectric green sheet through a screen printing method to form an internal electrode having a thickness ranging from 1.0 um to 1.5 um.

Dielectric green sheets, each with the internal electrode printed thereon are laminated, pressed, and severed to fabricate a chip. Debinding was performed on the chip at 230 L for 60 hours, and then, fired in a reduced atmosphere under an oxygen partial pressure of $10^{-11} \sim 10^{-10}$, lower than a Ni/NiO equilibrium oxygen partial pressure, such that the internal electrode was not oxidized at 1200 □.

Table 1 shows evaluation results with respect to print characteristics, electrical characteristics, a generation of cracks therein of the samples fabricated according to the foregoing method while changing the content of polyvinyl butyral (PVB) and molecular weight thereof after being dispersed.

In the evaluation of print characteristics, the printed internal electrode was observed by an optical microscope to evaluate the presence or absence of spreading, resolution, and leveling characteristics.

The electrical characteristics were evaluated based on whether or not a 100% capacity over a design value was implemented, whether or not a short was generated, and the like.

TABLE 1

| Sample | Particle size of nickel (nm) | Content of nickel (parts by weight) | Content of PVB (parts by weight) | Molecular weight after PVB dispersion | Printability | Electrical characteristics | Crack |
|---|---|---|---|---|---|---|---|
| 1* | 100 | 100 | 0.3 | 170000 | ○ | ○ | x |
| 2 | 100 | 100 | 1.0 | 170000 | ○ | ○ | ○ |
| 3* | 100 | 100 | 1.0 | 190000 | x | x | ○ |
| 4 | 100 | 100 | 2.0 | 120000 | ○ | □ | ○ |
| 5* | 100 | 100 | 2.5 | 110000 | x | x | ○ |
| 6 | 200 | 100 | 0.6 | 110000 | ○ | □ | ○ |
| 7 | 200 | 100 | 1.0 | 70000 | □ | ○ | ○ |
| 8 | 200 | 100 | 2.0 | 70000 | □ | ○ | ○ |
| 9 | 200 | 100 | 2.4 | 130000 | ○ | ○ | ○ |
| 10* | 200 | 100 | 2.7 | 160000 | x | x | ○ |
| 11* | 300 | 100 | 0.5 | 95000 | □ | ○ | x |
| 12 | 300 | 100 | 1.0 | 150000 | ○ | ○ | ○ |
| 13 | 300 | 100 | 1.0 | 160000 | ○ | ○ | ○ |
| 14 | 300 | 100 | 2.2 | 100000 | ○ | □ | ○ |
| 15* | 300 | 100 | 2.5 | 180000 | x | x | ○ |
| 16* | 400 | 100 | 0.2 | 165000 | ○ | ○ | x |
| 17 | 400 | 100 | 1.0 | 120000 | ○ | □ | ○ |
| 18* | 400 | 100 | 3.0 | 200000 | x | x | ○ |
| 19* | 400 | 100 | 3.0 | 50000 | x | x | ○ |
| 20* | 400 | 100 | 5.0 | 75000 | x | x | ○ |

*Comparative example
x: poor
○: good
□: excellent

With reference to Table 1, samples 1, 11, and 16, in which the contents of PVB were 0.3, 0.5, and 0.2 parts by weight, respectively, which were less than 0.6 parts by weight, had good printability and electrical characteristics but had a generation of cracks therein.

Sample 5 had PVB having a content of 2.5 parts by weight, sample 10 had PVB having a content of 2.7 parts by weight, sample 15 PVB having a content of 2.5 parts by weight, and sample 18 PVB having a content of 3.0 parts by weight. In all of these samples, the content of PVB exceeded 2.4 parts by weight, exhibiting poor printability and electrical characteristics.

Thus, it can be seen that when the content of PVB is 0.6 to 2.4 parts by weight, an excellent effect is obtained in relation to printability, electrical characteristics, and a generation of cracks therein.

After PVB was dispersed, sample 3 had a molecular weight of 190000, sample 15 had a molecular weight of 180000, and sample 18 had a molecular weight of 200000. The molecular weights of all of these samples exceeded 170000, exhibiting poor printability and electrical characteristics.

Thus, it can be seen that when the molecular weight is equal to or less than 170000 after the PVB dispersion, an excellent effect is obtained in relation to printability and electrical characteristics.

Table 2 shows evaluation results of a generation of cracks according to the content of ethyl cellulose when ethyl cellulose is added. A conductive paste was fabricated by adding polyvinyl butadiene and ethyl cellulose to 100 parts by weight of nickel having an average particle size of 300 nm, and a multilayer ceramic capacitor was fabricated including an internal electrode formed with the fabricated conductive paste, and the results obtained by evaluating printability, electrical characteristics, and a generation of cracks therein are shown in Table 2 below.

TABLE 2

| Sample | Particle size of nickel (nm) | Content of nickel (parts by weight) | Content of EC (parts by weight) | Content of EC (parts by weight) | Average molecular weight after PVB dispersion | Printability | Electrical characteristics | Crack |
|---|---|---|---|---|---|---|---|---|
| 1 | 300 | 100 | 2.0 | 2.0 | 150000 | o | o | o |
| 2 | 300 | 100 | 3.0 | 0.7 | 110000 | o | o | o |
| 3* | 300 | 100 | 3.1 | 0.7 | 120000 | o | o | x |
| 4* | 300 | 100 | 3.3 | 0.5 | 100000 | o | o | x |

*Comparative example x: poor o: good

With reference to FIG. 2, it can be seen that when the content of EC was 3.0, there was no crack generation, while when the content of EC was 3.1, cracks were generated.

As set forth above, according to embodiments of the invention, the use of the conductive paste according to an embodiment of the present invention can reduce internal stress of a multilayer ceramic electronic component, thus restraining a generation of cracks therein in the multilayer ceramic electronic component.

While the present invention has been shown and described in connection with the embodiments, it will be apparent to those skilled in the art that modifications and variations can be made without departing from the spirit and scope of the invention as defined by the appended claims.

What is claimed is:

1. A conductive paste for an internal electrode of a multilayer ceramic electronic component, the conductive paste comprising:
    100 parts by weight of a conductive metal powder; and
    0.6 to 2.4 parts by weight of polyvinyl butyral (PVB),
    wherein a molecular weight after PVB dispersion is 170000 or less.

2. The conductive paste of claim 1, further comprising a cellulose-based resin having a content equal to or less than 3.0 parts by weight.

3. The conductive paste of claim 2, wherein the cellulose-based resin is ethyl cellulose.

4. The conductive paste of claim 1, wherein the conductive metal powder is one or more selected from the group consisting of silver (Ag), lead (Pb), platinum (Pt), nickel (Ni), and copper (Cu).

5. The conductive paste of claim 1, wherein the conductive metal powder has an average particle size ranging from 50 nm to 400 nm.

6. A multilayer ceramic electronic component comprising:
    a ceramic main body; and
    an internal electrode formed within the ceramic main body by using a conductive paste for an internal electrode including 100 parts by weight of a conductive metal powder and 0.6 to 2.4 parts by weight of polyvinyl butyral (PVB),
    wherein a molecular weight after PVB dispersion is 170000 or less.

7. The multilayer ceramic electronic component of claim 6, wherein the conductive paste for an internal electrode further comprises a cellulose-based resin having a content equal to or less than 3.0 parts by weight.

8. The multilayer ceramic electronic component of claim 7, wherein the cellulose-based resin is ethyl cellulose.

9. The multilayer ceramic electronic component of claim 6, wherein the conductive metal powder is one or more selected from the group consisting of silver (Ag), lead (Pb), platinum (Pt), nickel (Ni), and copper (Cu).

10. The multilayer ceramic electronic component of claim 6, wherein the conductive metal powder has an average particle size ranging from 50 nm to 400 nm.

* * * * *